US012307335B2

(12) United States Patent
Karri et al.

(10) Patent No.: US 12,307,335 B2
(45) Date of Patent: May 20, 2025

(54) USER ASSISTANCE THROUGH DEMONSTRATION

(71) Applicant: INTERNATIONAL BUSINESS MACHINES CORPORATION, Armonk, NY (US)

(72) Inventors: Venkata Vara Prasad Karri, Visakhapatnam (IN); Kiruthikalakshmi Periasamy, Erode (IN); Sarbajit K. Rakshit, Kolkata (IN); Hemant Kumar Sivaswamy, Pune (IN)

(73) Assignee: International Business Machines Corporation, Armonk, NY (US)

( * ) Notice: Subject to any disclaimer, the term of this patent is extended or adjusted under 35 U.S.C. 154(b) by 911 days.

(21) Appl. No.: 17/448,394

(22) Filed: Sep. 22, 2021

(65) Prior Publication Data
US 2023/0087133 A1 Mar. 23, 2023

(51) Int. Cl.
*G06N 20/00* (2019.01)
(52) U.S. Cl.
CPC ...... *G06N 20/00* (2019.01); *A63F 2300/8082* (2013.01); *G05B 2219/40131* (2013.01)
(58) Field of Classification Search
CPC .......... G06N 20/00; G06N 2219/39451; A63F 2300/8082; B60K 2370/177; G05B 2219/40131
See application file for complete search history.

(56) References Cited

U.S. PATENT DOCUMENTS

| | | | |
|---|---|---|---|
| 2012/0293506 A1 | 11/2012 | Vertucci | |
| 2013/0326364 A1 | 12/2013 | Latta | |
| 2013/0346168 A1* | 12/2013 | Zhou | G06F 1/163 |
| | | | 701/428 |
| 2018/0168518 A1 | 6/2018 | Kaleal, III | |
| 2020/0286404 A1 | 9/2020 | Buras | |
| 2020/0368616 A1* | 11/2020 | Delamont | H04N 13/239 |
| 2021/0357029 A1* | 11/2021 | Cella | G06Q 20/405 |
| 2022/0309948 A1* | 9/2022 | Publicover | G06Q 50/20 |

FOREIGN PATENT DOCUMENTS

CN 104516492 A 4/2015

OTHER PUBLICATIONS

Disclosed Anonymously, "AI Assistance Interaction with Visual Simulation on Edge Device," IP.com, Jul. 1, 2020, 6 pages, Retrieved from the Internet: <URL: IP.com No. IPCOM000262813D>.

(Continued)

*Primary Examiner* — Quoc A Tran
(74) *Attorney, Agent, or Firm* — Anthony Curro

(57) ABSTRACT

A method, computer system, and a computer program product for handheld demonstration is provided. The present invention may include creating an artificial human. The present invention may include determining that assistance of the artificial human is needed by a user. The present invention may include projecting the artificial human onto an augmented reality (AR) or virtual reality (VR) device of the user. The present invention may include monitoring the user's behavior. The present invention may include modifying the projected artificial human based on the user's monitored behavior.

20 Claims, 6 Drawing Sheets

(56) References Cited

OTHER PUBLICATIONS

Disclosed Anonymously, "Method of Using Holographic Objects for Virtual Guidance of Procedures and Troubleshooting," IP.com, Sep. 9, 2016, 5 pages, IP.com No. IPCOM000247478D, Retrieved from the Internet: <URL: https://priorart.ip.com/IPCOM/000247478>.

Disclosed Anonymously, "System for 3D Holographic Assistance on a Mobile Device," IP.com, May 15, 2018, 5 pages, IP.com No. IPCOM000253914D, Retrieved from the Internet: <URL: https://priorart.ip.com/IPCOM/000253914>.

Hitti, "Samsung's artificial Neon humans are "a new kind of life"," dezeen.com, Jan. 15, 2020 [accessed on Aug. 4, 2021], 18 pages, Retrieved from the Internet: <URL: https://www.dezeen.com/2020/01/15/samsung-neon-star-labs-artificial-humans/>.

Kouris, et al., "HOLOBALANCE: An Augmented Reality virtual trainer solution for balance training and fall prevention," 2018 40th Annual International Conference of the IEEE Engineering in Medicine and Biology Society (EMBC), Jul. 18-21, 2018, 4 pages, IEEE, Honolulu, HI, USA, DOI: 10.1109/EMBC.2018.8513357, Retrieved from the Internet: < URL: https://ieeexplore.ieee.org/document/8513357>.

Mell, et al., "The NIST Definition of Cloud Computing", National Institute of Standards and Technology, Special Publication 800-145, Sep. 2011, 7 pages.

Teston, et al. "Digital avatars as humanized museum guides in the convergence of extended reality," Museweb.net [online], Apr. 2021 [accessed on Jun. 18, 2021], 18 pages, Retrieved from the Internet: <URL: https://mw21.museweb.net/paper/digital-avatars-as-humanized-museum-guides-in-the-convergence-of-extended-reality/>.

Winn, "Free AR Meeting Platform Lets Avatars Work Side by Side," MIT News, Jul. 24, 2020 [accessed on Jun. 18, 2021], 8 pages, Retrieved from the Internet: <URL: https://alum.mit.edu/slice/free-ar-meeting-platform-lets-avatars-work-side-side>.

Zhu, et al., "Haptic-feedback smart glove as a creative human-machine interface (HMI) for virtual/augmented reality applications," Sciences Advances [research article], May 8, 2020, 15 pages, vol. 6, No. 19, DOI: 10.1126/sciadv.aaz8693, Retrieved from the Internet: <URL: https://advances.sciencemag.org/content/6/19/eaaz8693.full>.

* cited by examiner

USER ASSISTANCE THROUGH DEMONSTRATION

BACKGROUND

The present invention relates generally to the field of computing, and more particularly to cognitive applications.

An augmented reality (AR) system and/or a virtual reality (VR) system may simulate a human experience by dynamically creating a user interface which may enable various interactions with digital content. The user interface may be an AR interface in which three-dimensional virtual images appear superimposed over real objects (e.g., an experience in which a computer designer enhances a part of a user's physical world with a computer-generated input including, but not limited to, a sound input, a video input, a graphical input, and/or a global positioning system (GPS) overlay, wherein the input responds in real time to changes in the user's environment). An AR device may project the digital content directly into a user's retina and may accordingly enable the user to visualize the digital content overlaid over the user's actual physical surrounding.

SUMMARY

Embodiments of the present invention disclose a method, computer system, and a computer program product for handheld demonstration. The present invention may include creating an artificial human. The present invention may include determining that assistance of the artificial human is needed by a user. The present invention may include projecting the artificial human onto an augmented reality (AR) or virtual reality (VR) device of the user. The present invention may include monitoring the user's behavior. The present invention may include modifying the projected artificial human based on the user's monitored behavior.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
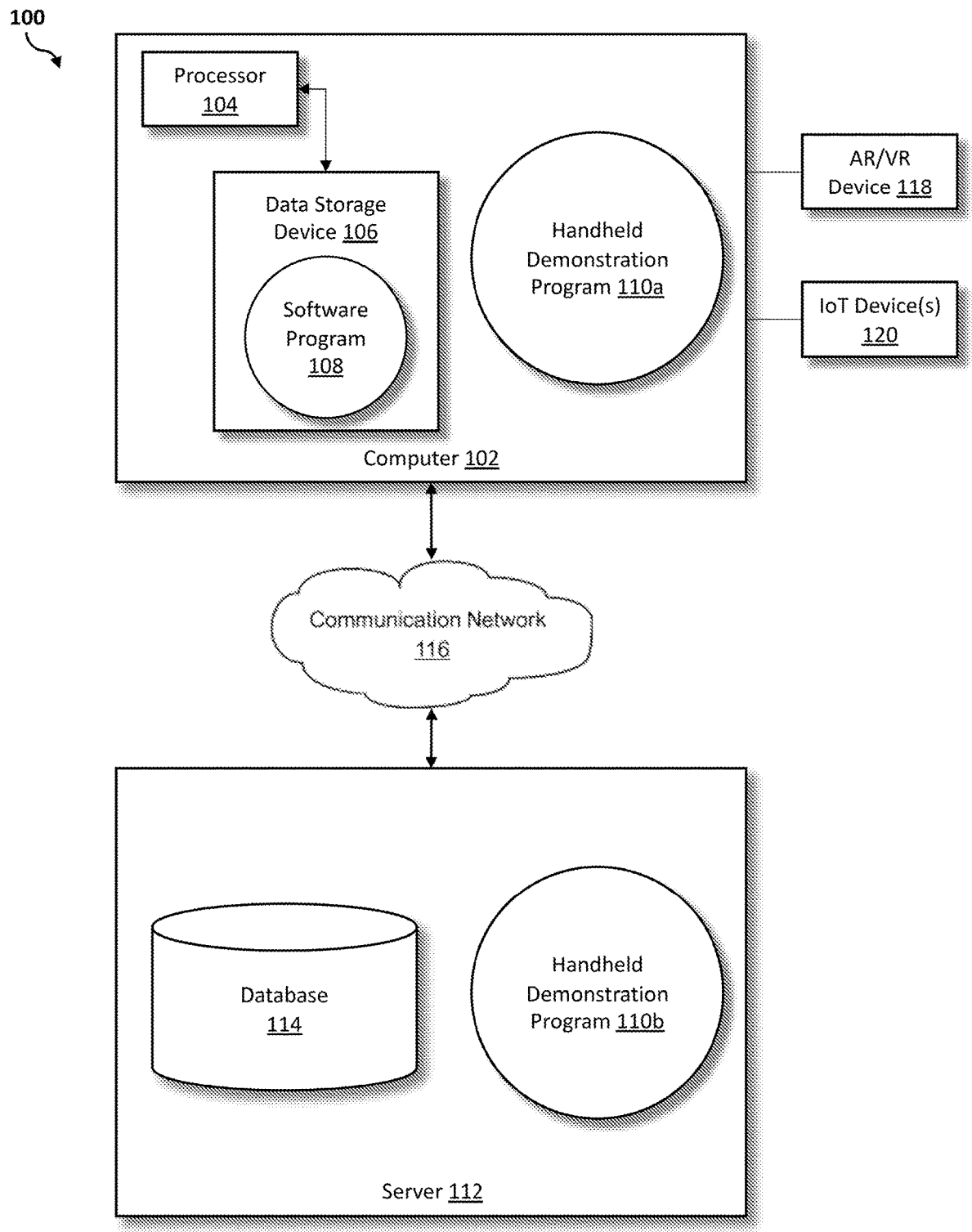
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method, and program product for handheld demonstration. As such, the present embodiment has the capacity to improve the technical field of handheld demonstration by providing a way to enable an augmented reality (AR) and/or a virtual reality (VR) based system which depicts an artificial human to provide a handheld demonstration and/or a step-by-step guidance instructing a user on how to perform an activity. More specifically, the present invention may include creating an artificial human. The present invention may include determining that assistance of the artificial human is needed by a user. The present invention may include projecting the artificial human onto an augmented reality (AR) or virtual reality (VR) device of the user. The present invention may include monitoring the user's behavior. The present invention may include modifying the projected artificial human based on the user's monitored behavior.

As described previously, an augmented reality (AR) system and/or a virtual reality (VR) system may simulate a human experience by dynamically creating a user interface which may enable various interactions with digital content. The user interface may be an AR interface in which three-dimensional virtual images appear superimposed over real objects (e.g., an experience in which a computer designer enhances a part of a user's physical world with a computer-generated input including, but not limited to, a sound input, a video input, a graphical input, and/or a global positioning system (GPS) overlay, wherein the input responds in real time to changes in the user's environment). An AR device may project the digital content directly into a user's retina and may accordingly enable the user to visualize the digital content overlaid over the user's actual physical surrounding. However, when a user seeks to perform an activity which the user does not have instructions for, the user may seek guidance from the overlaid system.

Therefore, it may be advantageous to, among other things, enable an augmented reality (AR) and/or a virtual reality (VR) based system which depicts an artificial human to provide a handheld demonstration and/or a step-by-step guidance instructing a user on how to perform an activity. During the handheld demonstration, the user may feel as though an experienced instructor (e.g., the artificial human) is assisting the user in performing the activity.

According to at least one embodiment, the present invention may include a head-mounted augmented reality (AR) system and/or a virtual reality (VR) system which may analyze a user's voice command and, after predicting that the user is seeking a handheld demonstration and/or a directed guidance of an activity being performed, the system may generate an artificial human to appear which may provide the handheld demonstration and/or the directed guidance to the user. The user may submit a voice or written request, explicitly asking for the handheld demonstration and/or directed guidance, or the system may observe that the user is struggling to perform an activity and may offer unprovoked assistance. In the case of observed user behavior, the system may be trained to track the user's actions and may have instructions (e.g., based on rules defined by the user) to offer assistance when certain types of activities are performed, or when activities are performed by a certain individual (e.g., a child), among other instructions.

According to at least one embodiment, the present invention may take into consideration a criticality of an activity being performed by the user, a physical position of the user, and/or a mobility of the user to predict whether assistance is required and, when assistance is required, an extent to the desired assistance.

According to at least one embodiment, the user may communicate with the artificial human verbally, for example, or by submitting written text into an interface connected to the handheld demonstration program during a handheld demonstration and/or guidance (e.g., with the artificial human using natural language processing (NLP) techniques to interpret spoken or written words of the user). The artificial human may communicate with the user through the use of haptic feedback (e.g., haptic technology, kinesthetic communication or 3D touch which uses technology to create an experience of touch by applying forces, vibrations, or motions to the user), among other things. The haptic feedback may be provided on a wearable device of the user which may be connected to the overall system.

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a handheld demonstration program 110a. The networked computer environment 100 may also include a server 112 that is enabled to run a handheld demonstration program 110b that may interact with a database 114 and a communication network 116. The networked computer environment 100 may include a plurality of computers 102 and servers 112, only one of which is shown. The communication network 116 may include various types of communication networks, such as a wide area network (WAN), local area network (LAN), a telecommunication network, a wireless network, a public switched network and/or a satellite network. The augmented reality (AR) or virtual reality (VR) device 118 and the Internet of Things (IoT) devices 120 are depicted as shown as their own separate entities but may be integrated into another part of the computer network environment. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the server computer 112 via the communications network 116. The communications network 116 may include connections, such as wire, wireless communication links, or fiber optic cables. As will be discussed with reference to FIG. 4, server computer 112 may include internal components 902a and external components 904a, respectively, and client computer 102 may include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. Client computer 102 may be, for example, a mobile device, a telephone, a personal digital assistant, a netbook, a laptop computer, a tablet computer, a desktop computer, or any type of computing devices capable of running a program, accessing a network, and accessing a database 114.

According to various implementations of the present embodiment, the handheld demonstration program 110a, 110b may interact with a database 114 that may be embedded in various storage devices, such as, but not limited to a computer/mobile device 102, a networked server 112, or a cloud storage service.

According to the present embodiment, a user using a client computer 102 or a server computer 112 may use the handheld demonstration program 110a, 110b (respectively) to enable an augmented reality (AR) and/or a virtual reality (VR) based system which depicts an artificial human to provide a handheld demonstration and/or a step-by-step guidance instructing a user on how to perform an activity. The handheld demonstration method is explained in more detail below with respect to FIGS. 2 and 3.

Figure 2:
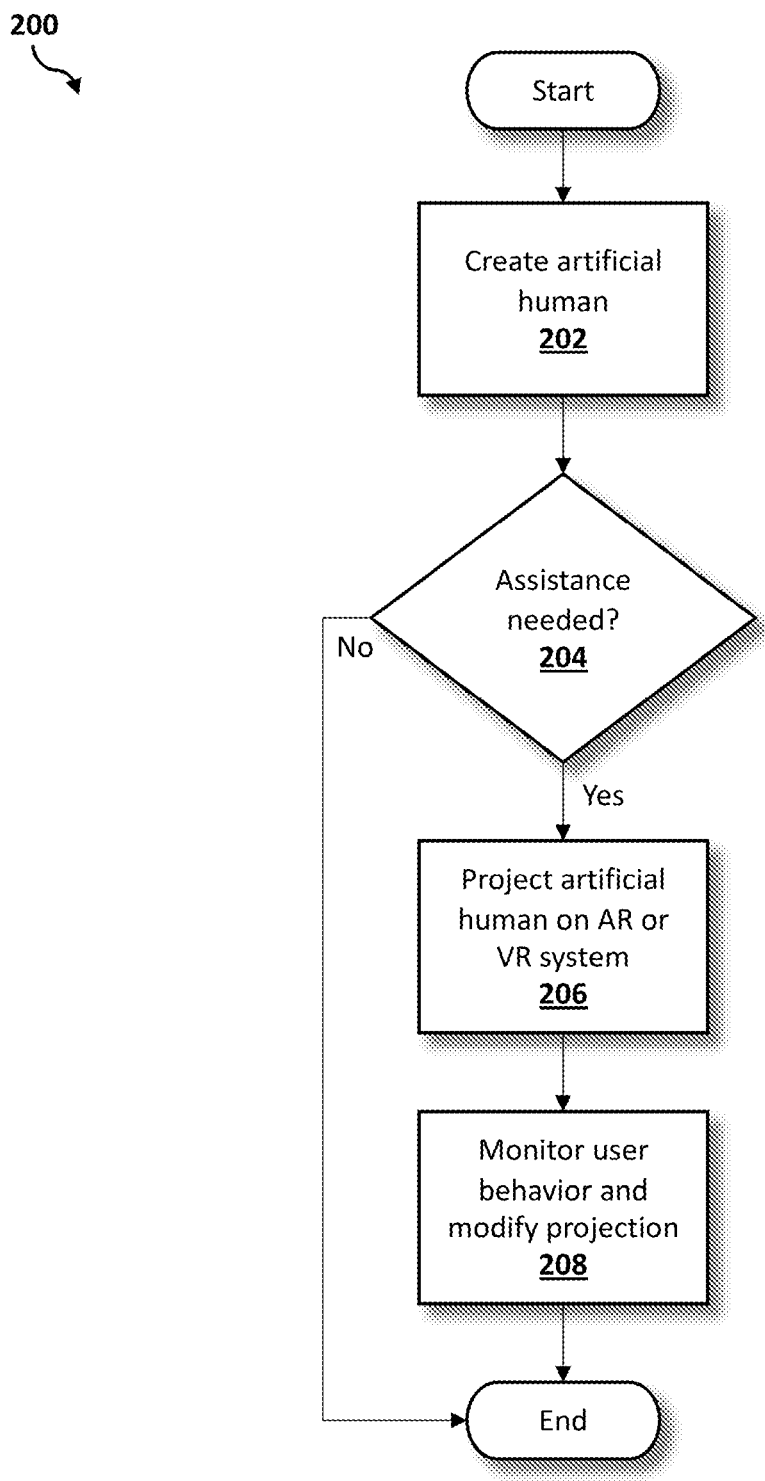
FIG. 2 is an operational flowchart illustrating a process for handheld demonstration according to at least one embodiment.

Referring now to FIG. 2, an operational flowchart illustrating the exemplary handheld demonstration process 200 used by the handheld demonstration program 110a and 110b according to at least one embodiment is depicted.

At 202, an artificial human is created. An artificial human may be a photorealistic digitized version of a human. The artificial human may embody human-like mannerisms, gestures, appearances, physical movements, body language, and/or sounds, among other things. The handheld demonstration program 110a, 110b may utilize (e.g., may be connected to) an augmented reality (AR) and/or a virtual reality (VR) device (e.g., a head mounted device), which may enable an interactive experience combining a real-world environment with computer-generated enhancements (e.g., including visual, auditory, haptic, somatosensory, and olfactory enhancements, either alone or in combination). As will be described in more detail with respect to step 206 below, the connected AR and/or VR device may project the created artificial human onto the retina of the device's user, thereby enabling the user to view the artificial human.

In this case, the artificial human may be a digitized embodiment of an Artificial Intelligence-powered digital assistant that powers a smart device ecosystem (e.g., including Internet of Things (IoT) devices of the user such as smart wearables and/or smart home devices, among other things).

The artificial human may be built based on natural language processing (NLP) by converting speech into words, sounds and/or ideas, among other things. For example, the artificial human may receive a verbal command from a user (it should be noted that this is merely an example and the received command may also be a written command, as will be described in more detail with respect to step 204 below), record the sound of the speech and consult a connected database (e.g., database 114) containing word pronunciations to determine which word(s) most closely correspond to the received sound, identify an intended task, and provide a visual representation of same to the user. The artificial human may learn by identifying how the user has historically performed activities and by tracking any mistakes made by the user which required the user to request assistance (whether verbally or in writing). The artificial human may also learn from public sources (e.g., including articles and/or videos on websites, among other things) and from user amendments (e.g., modifications to videos or other instructions found online). The system may reference a connected database (e.g., database 114) each time a video or instruction is retrieved to determine whether any user modification has been previously made. Based on observation and the use of a machine learning model, the artificial human of the handheld demonstration program 110a, 110b may be trained to identify activities, predict mistakes which may be made by the user while carrying out these activities, and provide guidance.

In an embodiment, a supervised machine learning classification model may be trained to predict that a user may need assistance, or that a user may modify a video or instruction, based on the user's previous modifications or based on the modifications of a similar user (e.g., the user may amend a way that the system is teaching something based on the user's likes and this may accordingly amend the method for every user determined to be similar based on similar user profile metrics). One or more of the following machine learning algorithms may be used: logistic regression, naive Bayes, support vector machines, deep neural networks, random forest, decision tree, gradient-boosted tree, multi-layer perceptron, and one-vs-rest. In an embodiment, an ensemble machine learning technique may be employed that uses multiple machine learning algorithms together to assure better prediction when compared with the prediction of a single machine learning algorithm. In this embodiment, training data for the model may include online articles and/or videos, past instances of user requests for help, user modifications to videos or other instructions found online, among other data. The training data may be collected from a single user or a group of users, with user consent required prior to the collection of any training data. The classification results may be stored in a database (e.g., database 114) and may be constantly updated.

According to at least one embodiment, in instances where the handheld demonstration program 110a, 110b is connected to Internet of Things (IoT) devices of the user (e.g., smart watches and/or smart home devices, among other devices), which continuously capture the user's data (e.g., including the user's behavior, mobility, relative position and/or activities performed, among other things), this captured data may be used in creating and modifying the artificial human who may act in accordance with the user's learned behaviors (e.g., who may speak softly or loudly based on a hearing condition of the user and/or who may utilize sign language, among other things). Captured user data may be stored in a connected database or personalized knowledge corpus of the user (e.g., database 114, relating to skills of the user, hobbies of the user, and/or many other things).

It is important to note that any real-time monitoring of the user as mentioned herein requires the informed consent of anyone whose biometric data is captured for analysis. Consent may be obtained in real time or through a prior waiver or other process that informs a subject that their data may be captured by sensors or other sensitive personal data may be gathered through any means and that this data may be analyzed by any of the many algorithms that may be implemented herein. A user may opt out of any portion of the real-time monitoring at any time.

At 204, the handheld demonstration program 110a, 110b determines that assistance is needed. This determination may be made based on analysis performed by a voice command analysis module using a voice command of the user (e.g., by identifying the user's needs, including whether the user is looking for handheld support, a demonstration, or something else). This determination may also be made based on an analysis of historical activities performed by the user, whereby the handheld demonstration program 110a, 110b may identify how the user is performing a present activity (e.g., using the AR and/or VR device, as well as any other connected IoT device which may be used to monitor a user's behavior) by analyzing historical data of the user as that data relates to the same or a similar activity (e.g., by identifying a user's skills relative to a particular activity).

The handheld demonstration program 110a, 110b may also determine a need for guidance without verbal or written request from a user, by observing that the user has performed some erroneous steps (e.g., based on the system being trained to know that the steps of the task being performed are usually performed in a way that is different from the way the user is presently performing them), or that kids should not be performing a particular activity, among other things, and may offer assistance based on this. This may require constant monitoring by the system, which the user has to consent to. It is important to note that any real-time monitoring of the user as mentioned herein requires the informed consent of anyone whose biometric (or otherwise) data is captured for analysis. As described previously, consent may be obtained in real time or through a prior waiver or other process that informs a subject that their data may be captured by sensors or other sensitive personal data may be gathered through any means, and such real-time monitoring may be opted out of at any time. A user may also deny assistance in the event that the user does not need or want a handheld demonstration or directed guidance. Monitoring of the system may be turned off by the user at any time using a gesture, among other things, to put the connected device (e.g., a connected IoT device) to sleep.

Based on historical data, a user's behavior, and/or a voice command of the user, the handheld demonstration program 110a, 110b may identify whether the user is looking for a handheld demonstration (e.g., where the artificial human will be holding the user's hand and will be showing the user how to perform a given activity), a guidance (e.g., where the artificial human will be showing the user how to perform the activity without physically holding the user's hand), and/or company (e.g., where the artificial human will be talking to the user and offering companionship). A determination as to whether the user desires a directed guidance, a companion, or a handholding may be based on a historically identified mistake which may be easily correctable, a type of mistake, a criticality of an activity performed by the user, and/or an identified user (e.g., a child performing a dangerous cooking activity).

A user's desires (e.g., for a handheld demonstration, a guidance, and/or companionship) may change depending on how far along the user is in performing the activity (e.g., a relative position of the user and a current stage of the activity) and the handheld demonstration program 110a, 110b may adjust the guidance accordingly. Performance of the activity may be analyzed using Internet of Things (IoT) connected devices (e.g., devices within the network which are embedded with sensors, software, and other technology capable of connecting to and exchanging information with other devices on the network, including smart mobile devices, smart wearables, and smart home appliances, among other things). The user may be prompted before an adjustment in the guidance is made, to confirm that a change in detected behavior and a corresponding new user desire are accurate. The user may be prompted in the interface for the handheld demonstration program 110a, 110b.

For example, the user's IoT feed may disclose that the user has a preference for loading the smart dishwasher in a particular style. The user's preference may be sent back to the artificial human for future reference. When the user is later receiving guidance from the artificial human on cooking a three-course meal and cleaning up after it, the system may detect when the user is at the point of loading the dishwasher and may prompt the user to end the guidance as the loading of the dishwasher begins (knowing that the user already has an established preference for this and will not want further assistance).

At 206, the handheld demonstration program 110a, 110b projects the created artificial human onto the AR and/or VR system. While the activity is performed by the user, the AR and/or VR device may project the artificial human onto the retina of the user of the device, such that the user may be able to view the artificial human in the user's own surroundings. The AR and/or VR system may align the user's position with the projected artificial human such that the artificial human will be projected at an almost exact position of the user (e.g., using any connected camera and/or IoT enabled systems to track the user's exact position).

A handheld demonstration, for example, may include projecting the artificial human over the user's position (e.g., aligning the artificial human to the user's position) to guide the user, by creating a visualization that the artificial human is holding the user's hands, on how to perform the activity. During the handheld demonstration, the user may not need to provide any spoken reply, as the artificial human may dynamically react to any physical actions of the user while performing the activity. The connected IoT device of the user (e.g., a wearable device) may further create a haptic effect in line with the projections of the handheld demonstration program 110a, 110b, such that the user may feel as though the artificial human is directing the user to perform the activity.

At 208, the handheld demonstration program 110a, 110b monitors the behavior of the user and modifies the projection, as appropriate. As described previously, the architecture of the handheld demonstration program 110a, 110b may include as many IoT devices as the user has (e.g., smart home appliances, smart personal devices, smart wearables, etc.) and those devices may communicate back to the developed artificial human (e.g., the digital assistant) or another smart device. There is no limit to the amount of integration of the present invention with other digital assistants or smart appliances which may gather and provide user data.

Figure 3:
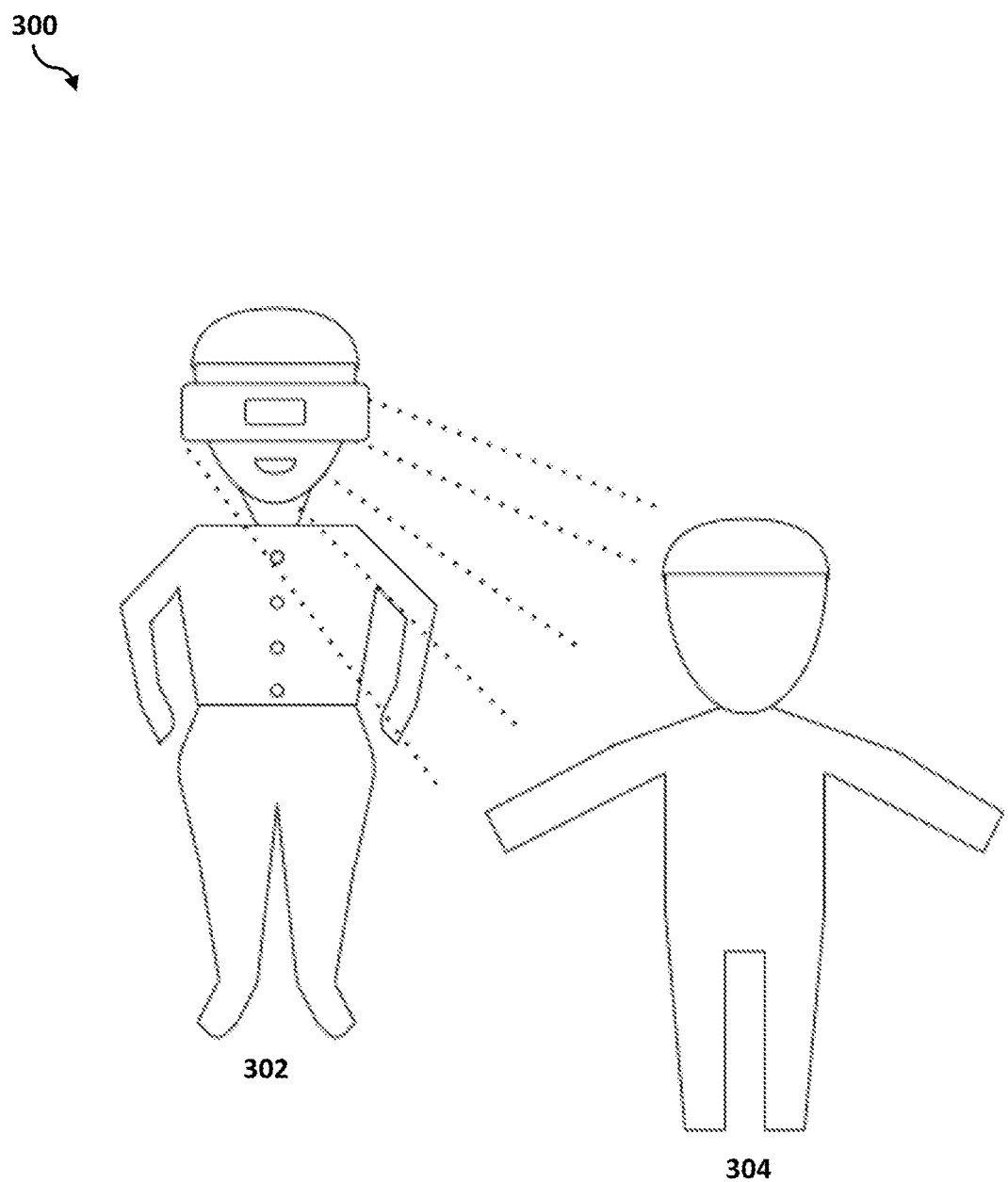
FIG. 3 is a block diagram of the handheld demonstration program according to at least one embodiment.

Referring now to FIG. 3, a block diagram 300 illustrating the exemplary handheld demonstration program 110a, 110b according to at least one embodiment is depicted. Here, a user 302 may seek a handheld demonstration and/or a directed guidance from an artificial human 304, with the artificial human 304 being positioned in such a way that the user 302 may feel as though an "expert" is guiding the user 302 to perform the activity. For example, the user 302 may be wearing smart glasses and may ask the artificial human 304 for help frying fish. The artificial human 304 may appear directly in front of the user 302 near where the user 302 is viewing a pan to fry the fish. This may enable the artificial human 304 to perform a handheld guidance with the user 302 following the steps directed by the artificial human 304 to perform the activity. Alternatively, the artificial human 304 may assist the user 302 without a handheld experience. This may still include the user 302 wearing smart glasses, but instead of the artificial human 304 appearing with the user's 302 own pan, the artificial human 304 may appear beside the user 302 with a pan of his own to simulate the user's 302 experience.

It may be appreciated that FIGS. 2 and 3 provides only an illustration of one embodiment and do not imply any limitations with regard to how different embodiments may be implemented. Many modifications to the depicted embodiment(s) may be made based on design and implementation requirements.

Figure 4:
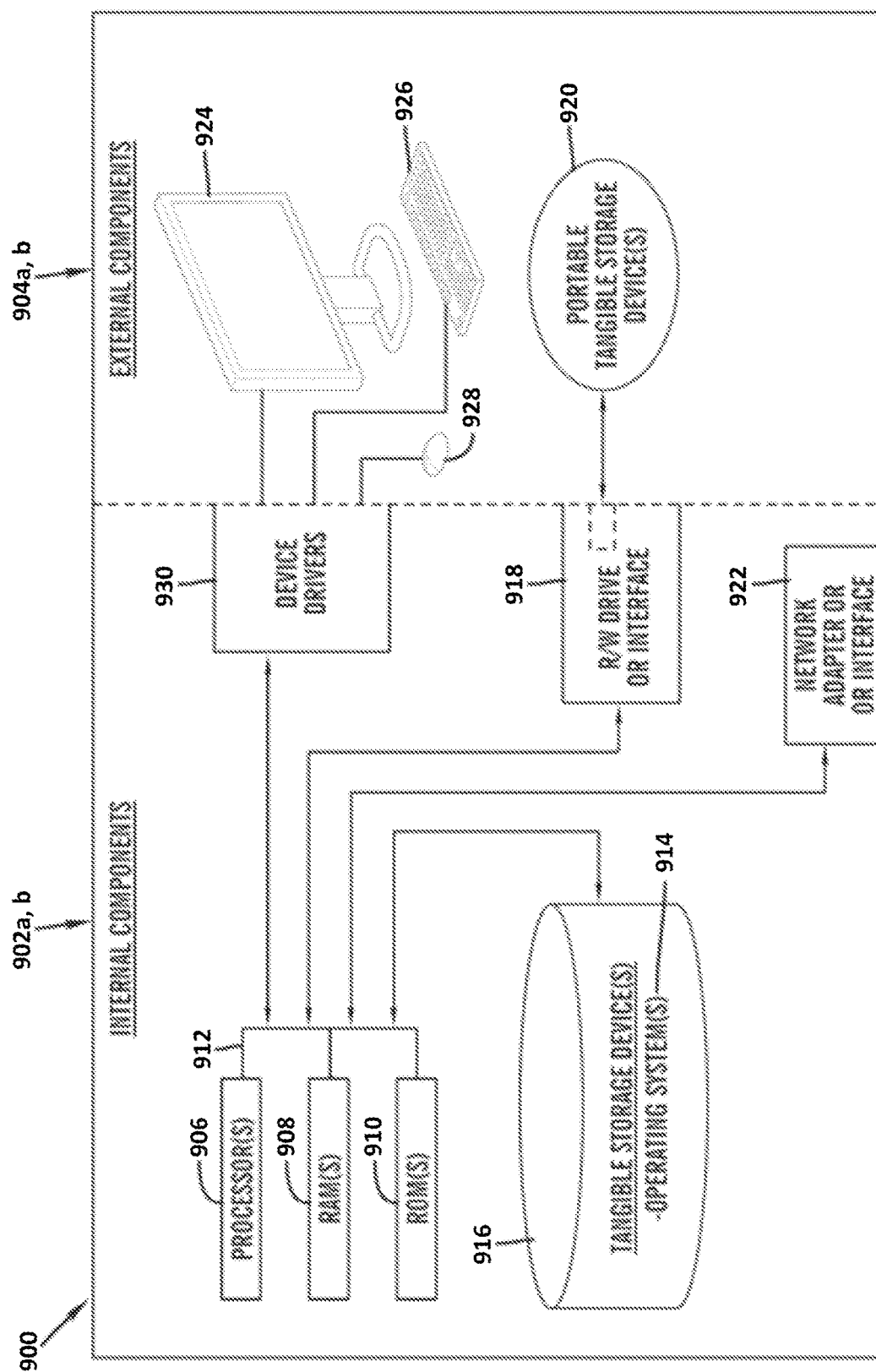
FIG. 4 is a block diagram of internal and external components of computers and servers depicted in FIG. 1 according to at least one embodiment.

FIG. 4 is a block diagram 900 of internal and external components of computers depicted in FIG. 1 in accordance with an illustrative embodiment of the present invention. It should be appreciated that FIG. 4 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may be represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 *a, b* and external components 904 *a, b* illustrated in FIG. 4. Each of the sets of internal components 902 *a, b* includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the handheld demonstration program 110a in client computer 102, and the handheld demonstration program 110b in network server 112, may be stored on one or more computer-readable tangible storage devices 916 for execution by one or more processors 906 via one or more RAMs 908 (which typically include cache memory). In the embodiment illustrated in FIG. 4, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 *a, b* also includes a R/W drive or interface 918 to read from and write to one or more portable computer-readable tangible storage devices 920 such as a CD-ROM, DVD, memory stick, magnetic tape, magnetic disk, optical disk, or semiconductor storage device. A software program, such as the software program 108 and the handheld demonstration program 110a and 110b can be stored on one or more of the respective portable computer-readable tangible storage devices 920, read via the respective R/W drive or interface 918 and loaded into the respective hard drive 916.

Each set of internal components 902 *a, b* may also include network adapters (or switch port cards) or interfaces 922 such as a TCP/IP adapter cards, wireless wi-fi interface cards, or 3G or 4G wireless interface cards or other wired or wireless communication links. The software program 108 and the handheld demonstration program 110a in client computer 102 and the handheld demonstration program 110b in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the handheld demonstration program 110a in client computer 102 and the handheld demonstration program 110b in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
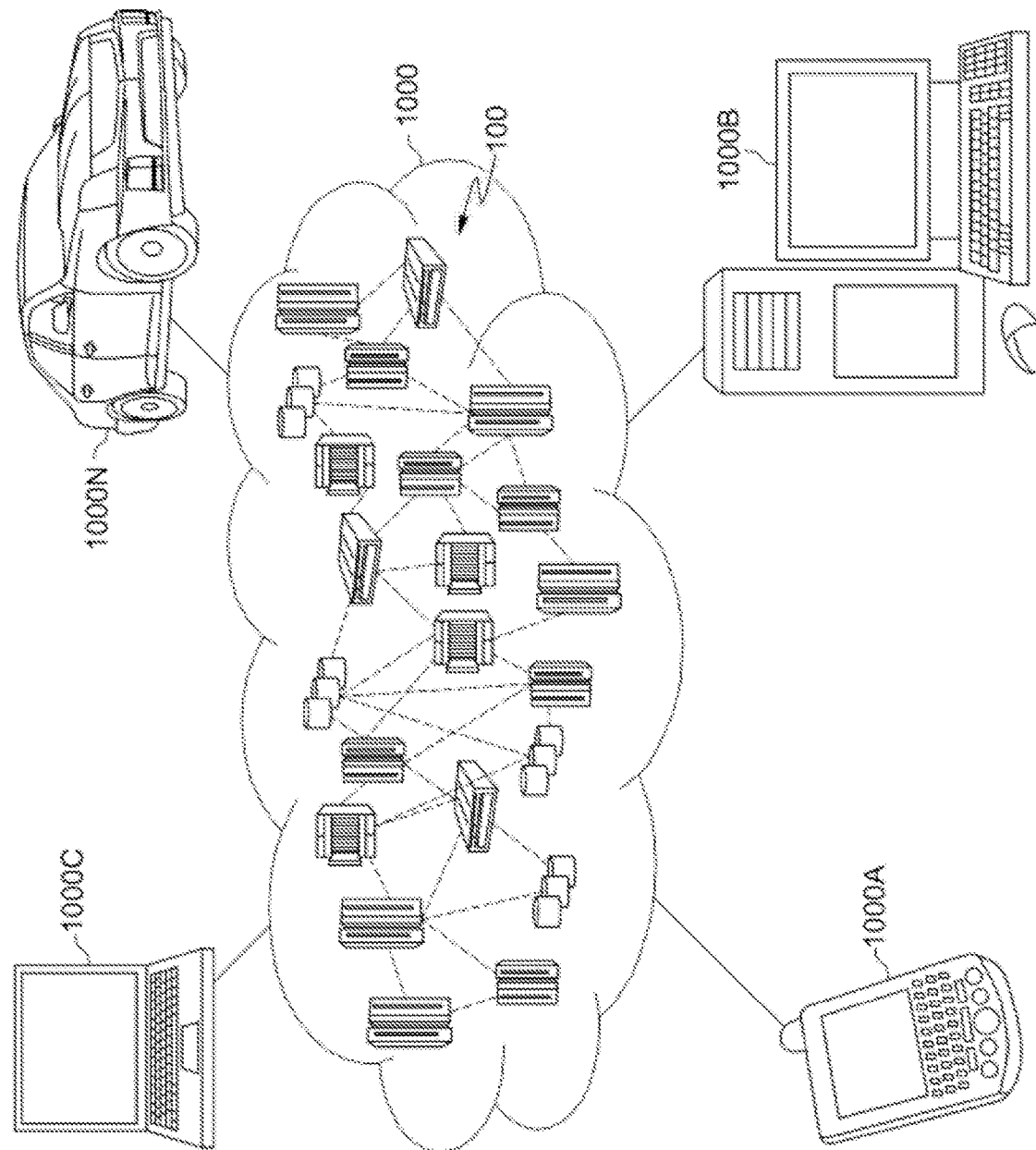
FIG. 5 is a block diagram of an illustrative cloud computing environment including the computer system depicted in FIG. 1, in accordance with an embodiment of the present disclosure.

Referring now to FIG. 5, illustrative cloud computing environment 1000 is depicted. As shown, cloud computing environment 1000 comprises one or more cloud computing nodes 100 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 5 are intended to be illustrative only and that computing nodes 100 and cloud computing environment 1000 can communicate with any type of computerized device over any type of network and/or network addressable connection (e.g., using a web browser).

Figure 6:
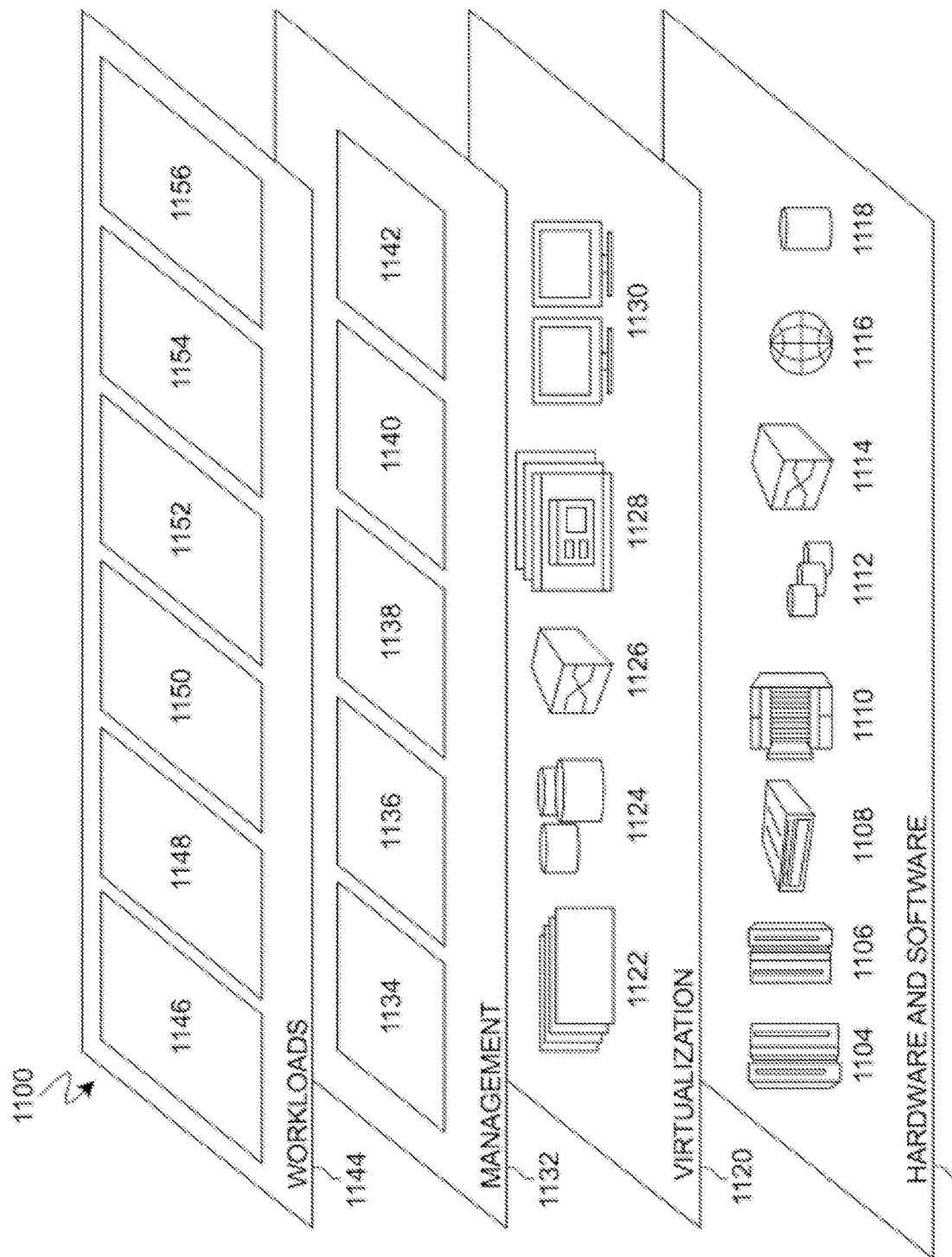
FIG. 6 is a block diagram of functional layers of the illustrative cloud computing environment of FIG. 5, in accordance with an embodiment of the present disclosure.

Referring now to FIG. 6, a set of functional abstraction layers 1100 provided by cloud computing environment 1000 is shown. It should be understood in advance that the components, layers, and functions shown in FIG. 6 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and handheld demonstration 1156. A handheld demonstration program 110a, 110b provides a way to enable an augmented reality (AR) and/or a virtual reality (VR) based system which creates an artificial human to provide a handheld demonstration and/or a step-by-step guidance instructing the user on how to perform the activity.

The descriptions of the various embodiments of the present invention have been presented for purposes of illustration but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for handheld demonstration, the method comprising:
   creating an artificial human;
   determining that assistance of the artificial human is needed by a user, the assistance instructing a user how to perform an activity using a depiction of the artificial human without verbal or written request from the user but by observing the user has performed erroneous steps;
   projecting the artificial human onto an augmented reality (AR) or virtual reality (VR) device of the user, the artificial human appearing to provide a demonstration or guidance to the user;
   monitoring the user's behavior; and
   modifying the projected artificial human based on the user's monitored behavior.

2. The method of claim 1, further comprising:
   a machine learning classification model trained to predict that a user needs assistance or that a user will modify a method of performing an activity.

3. The method of claim 1, wherein the artificial human is a digital assistant, built using natural language processing (NLP), which learns how the user has historically performed an activity and determines, in real-time, whether the user presently requires assistance.

4. The method of claim 1, wherein determining that assistance of the artificial human is needed by the user is based on real-time biometric data from at least one connected Internet of Things (IoT) device of the user and historical user data from a connected database.

5. The method of claim 1, wherein monitoring the user's behavior includes receiving real-time biometric data from at least one connected Internet of Things (IoT) device of the user.

6. The method of claim 1, wherein modifying the projected artificial human based on the user's monitored behavior further comprises:
   stopping the projection of the artificial human onto the augmented reality (AR) or virtual reality (VR) device of the user.

7. The method of claim 1, wherein modifying the projected artificial human based on the user's monitored behavior further comprises:
   determining that a similar user has amended a performance of an activity being performed by the user in the same or a similar way.

8. A computer system for handheld demonstration, comprising:
   one or more processors, one or more computer-readable memories, one or more computer-readable tangible storage medium, and program instructions stored on at least one of the one or more tangible storage medium for execution by at least one of the one or more processors via at least one of the one or more memories, wherein the computer system is capable of performing a method comprising:
   creating an artificial human;
   determining that assistance of the artificial human is needed by a user, the assistance instructing a user how to perform an activity using a depiction of the artificial human without verbal or written request from the user but by observing the user has performed erroneous steps;

projecting the artificial human onto an augmented reality (AR) or virtual reality (VR) device of the user, the artificial human appearing to provide a demonstration or guidance to the user;

monitoring the user's behavior; and modifying the projected artificial human based on the user's monitored behavior.

9. The computer system of claim 8, further comprising:

a machine learning classification model trained to predict that a user needs assistance or that a user will modify a method of performing an activity.

10. The computer system of claim 8, wherein the artificial human is a digital assistant, built using natural language processing (NLP), which learns how the user has historically performed an activity and determines, in real-time, whether the user presently requires assistance.

11. The computer system of claim 8, wherein determining that assistance of the artificial human is needed by the user is based on real-time biometric data from at least one connected Internet of Things (IoT) device of the user and historical user data from a connected database.

12. The computer system of claim 8, wherein monitoring the user's behavior includes receiving real-time biometric data from at least one connected Internet of Things (IoT) device of the user.

13. The computer system of claim 8, wherein modifying the projected artificial human based on the user's monitored behavior further comprises:

stopping the projection of the artificial human onto the augmented reality (AR) or virtual reality (VR) device of the user.

14. The computer system of claim 8, wherein modifying the projected artificial human based on the user's monitored behavior further comprises:

determining that a similar user has amended a performance of an activity being performed by the user in the same or a similar way.

15. A computer program product for handheld demonstration, comprising:

one or more non-transitory computer-readable storage media and program instructions stored on at least one of the one or more tangible storage media, the program instructions executable by a processor to cause the processor to perform a method comprising:

creating an artificial human;

determining that assistance of the artificial human is needed by a user, the assistance instructing a user how to perform an activity using a depiction of the artificial human without verbal or written request from the user but by observing the user has performed erroneous steps;

projecting the artificial human onto an augmented reality (AR) or virtual reality (VR) device of the user, the artificial human appearing to provide a demonstration or guidance to the user;

monitoring the user's behavior; and modifying the projected artificial human based on the user's monitored behavior.

16. The computer program product of claim 15, further comprising:

a machine learning classification model trained to predict that a user needs assistance or that a user will modify a method of performing an activity.

17. The computer program product of claim 15, wherein the artificial human is a digital assistant, built using natural language processing (NLP), which learns how the user has historically performed an activity and determines, in real-time, whether the user presently requires assistance.

18. The computer program product of claim 15, wherein determining that assistance of the artificial human is needed by the user is based on real-time biometric data from at least one connected Internet of Things (IoT) device of the user and historical user data from a connected database.

19. The computer program product of claim 15, wherein monitoring the user's behavior includes receiving real-time biometric data from at least one connected Internet of Things (IoT) device of the user.

20. The computer program product of claim 15, wherein modifying the projected artificial human based on the user's monitored behavior further comprises:

stopping the projection of the artificial human onto the augmented reality (AR) or virtual reality (VR) device of the user.

* * * * *